Jan. 20, 1959 — G. W. BOWDEN — 2,869,700
POSITIVE CLUTCH WITH DAMPING ARRANGEMENT
Filed Nov. 19, 1954
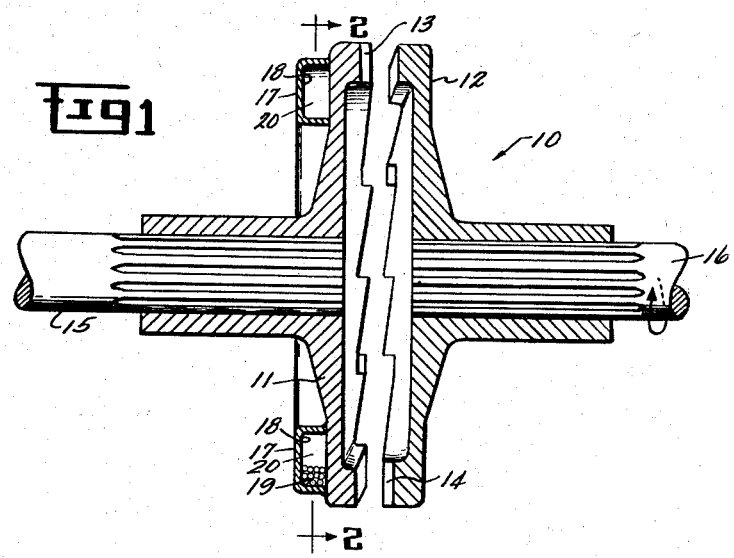
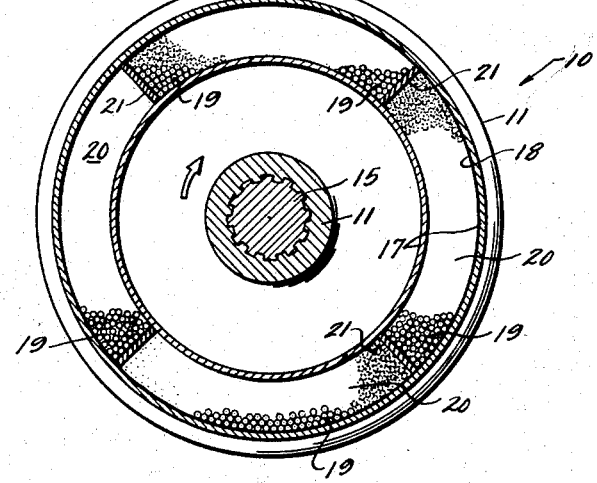
INVENTOR.
GEORGE W. BOWDEN
BY
HIS ATTORNEY—

2,869,700

POSITIVE CLUTCH WITH DAMPING ARRANGEMENT

George W. Bowden, Beverly, Mass., assignor to General Electric Company, a corporation of New York Application November 19, 1954, Serial No. 469,875

4 Claims. (Cl. 192—67)

This invention relates generally to a clutch mechanism for jet engine starters and particularly to a means for preventing rebound of the clutch members on engagement.

It is common practice to provide an engine starter with a clutch which allows a transmission of torque from the starter to the engine and prevents torque from being transmitted from the engine to the starter. In this type of clutch, it is common to have the torque transmitting members disengaged when the starter begins to rotate at the beginning of the starting cycle. When clutch engagement is accomplished, the rotating member associated with the starter engages a stationary member associated with the engine. One form of a clutch of this type is described in a copending application of Dallas E. Cain and George H. Fry, Jr., S. N. 326,504, filed December 17, 1952, which issued as Patent No. 2,752,023 on June 26, 1956, and is assigned to the assignee of the present invention. In some applications the impact between the rotating and stationary clutch members on engagement is of sufficient force to cause considerable rebound of the clutch members. It is important to minimize the magnitude of the rebound in order to prevent excessive shaft stresses from occurring. Accordingly, an object of this invention is to provide a clutch arrangement which minimizes the rebound on engagement.

Another object of the invention is to provide a lightweight starter clutch damping arrangement suitable for use with aircraft jet engines.

The objects of my invention may be realized by providing a floating mass in connection with the clutch driving member.

My invention will be better understood by the following description taken in connection with the accompanying drawing in which Fig. 1 is a longitudinal sectional view of a preferred embodiment of the invention and Fig. 2 is a sectional view taken along the line 2—2 of Fig. 1.

In the drawing, the clutch arrangement is shown generally at 10. The torque transmitting members are a rotatable starter dog 11 which is integral with or suitably attached by spline or key means to the starter output shaft 15, and an engine dog 12 which is integral with or suitably attached to a shaft 16 which is connected directly or through suitable gears to the engine rotor (not shown). Both dogs have conventional type cantilever mounted teeth 13 and 14 on their respective contacting faces, tapered along one edge and straight along their contact edges. In Fig. 1, the clutch is shown in its disengaged position. Engagement is accomplished by moving either the starter dog or the engine dog axially towards the other.

A housing 17 is fastened to the surface of the starter dog 11 and extends circumferentially about the axis of the starter output shaft 15. The annual chamber 18 within the housing 17 is divided by partitions 21 into a plurality of arcuate chambers 20. The arcuate chambers are partially filled with a mobile substance 19 such as mercury, sand, small shot, iron filings, or any substance which will flow freely. For purposes of illustration, the mobile substance 19 is depicted as small shot in the drawings.

The direction of rotation of the engine starter is indicated by the arrow in Fig. 2. The starting cycle is initiated by accelerating the starter dog 11. During the initial acceleration of the starter dog 11, the mobile substance 19 in each of the arcuate chambers 20 acts as a free body tending to remain at rest. This action forces the substance in each chamber against the partition 21, assuming the position indicated by the broken lines in Fig. 2. The mobile substance 19 will remain in this relative position so long as the original acceleration sense is maintained. When engagement is accomplished, the rotating starter dog 11 contacts the stationary engine dog 12 with a resulting sudden deceleration of the starter dog which causes the mobile material 19 in each arcuate chamber to traverse the length of the chamber and strike the partition 21 at the opposite end of the chamber. At the instant of engagement, the starter dog 11 decelerates rapidly but the free mass of mobile material 19 will maintain the velocity it had immediately before the engagement. During the period in which the mobile material traverses the length of the arcuate chambers 20, the starter dog 11 will begin to rebound as a result of the impact and the resiliency of the contacting teeth 13 and 14 and flexibility of the starter dog 11 and shaft 15. It is well known that the torsional stresses in the shaft increase with the magnitude of rebound. In the present arrangement the amplitude of rebound is reduced by the free mass of mobile material 19 striking the partitions 21 and creating a force opposing the rebound.

While a particular embodiment of the invention has been illustrated and described, it will be obvious to those familiar with the art that various changes and modifications may be made without departing from the invention and it is intended to cover in the appended claims all such changes and modifications that come within the true spirit and scope of the invention.

What I claim as new and desire to secure by Letters Patent of the United States is:

1. In an engine starter mechanism, a clutch device comprising a starter clutch dog having teeth thereon adapted to engage similar mating teeth on an engine clutch dog, walls forming a plurality of arcuate chambers, means for causing said walls to rotate with said starter clutch dog, and a quantity of mobile substance partially filling each of said arcuate chambers, at least one of said walls being rigidly secured in the peripheral path of said mobile substance so as to be capable of absorbing kinetic energy by impact therefrom when said starter clutch dog is rapidly decelerated relative to said mobile substance.

2. In a device for starting an engine, an output shaft, a driving element connected to said output shaft and having teeth thereon, adapted to engage mating teeth on a driven element connected to said engine, walls defining an annular chamber surrounding the axis of said output shaft, permanent partitions dividing said annular chamber into a plurality of arcuate chambers, a quantity of mobile substance partly filling each of said arcuate chambers and means for causing said arcuate chambers to rotate with said driving member, at least a portion of said permanent partitions being rigidly secured in the peripheral path of said mobile substance so as to be capable of absorbing kinetic energy by impact therefrom when said driving element is rapidly decelerated relative to said mobile substance.

3. In combination with an engine starter having an output shaft, a clutch device having a driving dog member with axially extending teeth thereon adapted to engage similar teeth on a driven dog member mounted on said engine, walls defining a plurality of arcuate chambers, said chambers having substantially equal dimensions, said walls being fastened to said driving dog for rotation therewith, and a quantity of mobile substance partially filling each of said arcuate chambers, said mobile substance being forced against one peripheral extremity of said chambers when said driving dog member is angularly accelerated and being impacted against the opposite peripheral extremity of said chambers when said driving dog member is rapidly decelerated.

4. In a clutch mechanism having a rotatable driving member adapted to engage a driven member and being subject to impact upon such engagement, walls defining a chamber partially surrounding the axis of rotation of said driving member, and means for causing said walls to rotate at a fixed speed relationship to said driving member, said chamber being partially filled along its circumferential dimension with a mobile substance, at least one of said walls being rigidly positioned in the circumferential path of said mobile substance so as to be capable of absorbing kinetic energy by impact therefrom when said driving member is rapidly decelerated relative to said mobile substance.

References Cited in the file of this patent

UNITED STATES PATENTS

| | | |
|---|---|---|
| 1,618,644 | Dickson | Feb. 22, 1927 |
| 1,921,880 | Hertz et al. | Aug. 8, 1933 |
| 2,002,561 | Wike | May 28, 1935 |
| 2,398,570 | Wildhaber | Apr. 16, 1946 |

OTHER REFERENCES

Serial No. 474,319, Burnat (A. P. C.), published July 13, 1943.